(12) United States Patent
Murray (10) Patent No.: US 8,931,708 B2
(45) Date of Patent: *Jan. 13, 2015

(54) TEMPERATURE AND LOW WATER MONITORING FOR BOILER SYSTEMS

(71) Applicant: C. Cowles & Company, New Haven, CT (US)

(72) Inventor: Christopher L. Murray, West Haven, CT (US)

(73) Assignee: C. Cowles & Company, New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,640

(22) Filed: Apr. 19, 2013

(65) Prior Publication Data

US 2013/0270351 A1    Oct. 17, 2013

Related U.S. Application Data

(63) Continuation of application No. 13/013,519, filed on Jan. 25, 2011, which is a continuation of application No. 11/697,063, filed on Apr. 5, 2007, now Pat. No. 7,891,572.

(51) Int. Cl.
| | |
|---|---|
| *F22B 37/46* | (2006.01) |
| *F22B 37/47* | (2006.01) |
| *F24H 9/20* | (2006.01) |
| *B23P 19/00* | (2006.01) |
| *G01F 23/00* | (2006.01) |
| *G06K 13/00* | (2006.01) |

(52) U.S. Cl.
CPC .............. *F24H 9/2007* (2013.01); *F22B 37/46* (2013.01); *F22B 37/47* (2013.01); *B23P 19/00* (2013.01); *G01F 23/00* (2013.01); *G06K 13/00* (2013.01)
USPC ........................................ 236/21 B; 236/21 R (58) Field of Classification Search
USPC ............. 236/21 R, 21 B; 73/290 R, 291, 292, 73/304 R
See application file for complete search history.

(56) References Cited

U.S. PATENT DOCUMENTS

| | | | |
|---|---|---|---|
| 4,537,068 A | 8/1985 | Wrobel et al. | |
| 4,654,290 A | 3/1987 | Spanjer | |
| 4,690,324 A | 9/1987 | Kasprzyk | |
| 4,834,284 A | 5/1989 | Vandermeyden | |

(Continued)

OTHER PUBLICATIONS

McMaster Carr Product Catalog, 113th Edition (Jan. 2007). Item# 6455T17: "Temperature and Humidity Sensor."

(Continued)

*Primary Examiner* — Jonathan Bradford
(74) *Attorney, Agent, or Firm* — Robert Curcio; DeLio, Peterson & Curcio, LLC (57) ABSTRACT

A dual functionality temperature control measurement and low water cutoff measurement system is taught within a single tapping to a boiler. This dual functionality combines a low water cutoff and temperature sensor into one control utilizing a sensing element suitable for use in a single existing tapping for a boiler. Independent of low water functionality, the temperature sensor is also capable of monitoring temperature as a replacement probe in an existing temperature sensor-only well. A conductive member provides a compression fit inside the probe well for thermistors, while simultaneously providing conduction with the well interior for a low water cutoff signal in a two-conductor well.

7 Claims, 8 Drawing Sheets

(56) References Cited

U.S. PATENT DOCUMENTS

| | | |
|---|---|---|
| 4,940,946 A | 7/1990 | Nazaryan |
| 5,053,978 A | 10/1991 | Solomon |
| 5,111,691 A | 5/1992 | John et al. |
| 5,178,009 A | 1/1993 | Arekapudi et al. |
| 5,318,363 A | 6/1994 | Mauric |
| 5,340,019 A | 8/1994 | Bohan et al. |
| 6,349,722 B1 | 2/2002 | Gradon |
| 6,390,027 B1 | 5/2002 | Lyons et al. |
| 7,090,140 B2 | 8/2006 | Feldmeth et al. |
| 7,436,187 B2 * | 10/2008 | Thomson ............... 324/446 |
| 2002/0026227 A1 | 2/2002 | Philips |
| 2003/0209056 A1 | 11/2003 | Dimarzo et al. |
| 2007/0110124 A1 | 5/2007 | Shiraki et al. |

OTHER PUBLICATIONS

IBM PC XT Technical Specification. http://www.old-computers.com/museum/computer.asp?c=286.

IBM PC XT Technical Specifications. (published Dec. 30, 2001 and regarding component commercially available in 1983). http://www.old-computers.com/museum/computer.asp?c=286.

* cited by examiner

TEMPERATURE AND LOW WATER MONITORING FOR BOILER SYSTEMS

BACKGROUND OF THE INVENTION

1. Field of the Invention

The present invention relates to safety devices that automatically cut-off the burner operation of a hot water boiler. More specifically, the present invention relates to the type of boiler used in residential and light commercial heating applications that include a control system for monitoring both the temperature and level of the water in the boiler. The system allows these attributes to be measured through a single probe inserted into the boiler through a single tapping.

2. Description of Related Art

In conventional boilers of the type used in residential and light commercial heating the water level is monitored with a low water cutoff (LWCO) sensor. When the water level in the boiler drops below the level of the low water cutoff sensor, the burner is turned off until the water level is brought back up to a safe level. These controls are well known in the art.

One example is U.S. Pat. No. 6,390,027, issued to Lyons and Murray, entitled, "CYCLE CONTROL SYSTEM FOR BOILER AND ASSOCIATED BURNER," which is incorporated by reference. In the '027 design, a cycle control system is used with a boiler to determine the presence of an adequate level of fluid within the boiler.

In operation, an LWCO has a probe that extends into the boiler through a single tapping. Generally, the probe has two electrically conductive surfaces that are isolated from each other. An electrical signal is provided to one of these conductive surfaces. When the water level is above the level of the probe, the circuit between the conductive surfaces is closed by virtue of the conductivity of the water surrounding the probe. When the water level falls below the probe, there is no conductivity between the metal conductive surfaces. Thus, the circuit is open, and the control detects a low water condition.

Another component of monitoring boiler systems is information concerning the temperature of the water in the boiler. There are many temperature control systems in the art currently used to monitor water temperature in a boiler. Commercially available temperature controllers include, for example, the Honeywell L7224U Aquastat Relay. In these devices, a temperature sensing thermistor is inserted into a hollow well. The hollow well is then inserted within a tapping in the boiler and the boiler is filled with water. The thermistor is connected to a central control unit. The central control unit monitors the temperature gradient, and is typically programmed to shut down the burner to prevent the water in the boiler from exceeding a preset limit. The central control unit may also be programmed to turn the burner ON to maintain a minimum boiler temperature.

In U.S. Pat. No. 5,340,019, issued to Bohan, Jr., et al., entitled, "ELECTRONIC AQUASTAT IN IMMERSIBLE CAPSULE," a liquid immersible electronic aquastat is taught in which a temperature responsive element and substantially all associated electronic circuitry are arranged on a circuit board within a tubular capsule of liquid impervious material. The capsule or well houses a thermocouple, while conducting heat energy from the surface of the well to the temperature sensor.

A need exists to combine the two safety functions of monitoring for low water cutoff and temperature measurement in a single probe with supporting control circuitry to allow it to perform in existing boiler tappings, thus eliminating the need to drain the boiler to insert a new tapping.

In U.S. Pat. No. 5,111,691, issued to John, et al., entitled, "CONDUCTANCE/THERMAL LIMIT CONTROL APPARATUS AND METHOD," a temperature probe is taught which mounts in a liquid container. The probe has a conductance electrode coupled to a conductance control circuit. A temperature sensor is combined with this low water cutoff probe. This control, however, does not allow for the ability to replace the sensor of an existing aquastat such as the Honeywell devices described above without draining the boiler and possibly the entire heating system. Furthermore, this design only provides high temperature limit with no provision to turn the burner on to maintain a minimum boiler temperature, or to control the circulator pump on a call for heat.

One problem in the industry has been the reluctance to accommodate multiple tappings for water cutoff probes and temperature sensor probes. This requires expensive redesigns of boiler castings to accommodate a second hole in the boiler wall for the additional probe. It is desirable to combine the two measurement functions in a single probe, which can be inserted into a single well. It is further desirable to construct a probe/well design that can accomplish the multiple measurements in a single device that is interchangeable with existing well designs currently available in the industry. In this manner, it is not necessary to provide a new tapping or to drain existing boilers currently in operation in order to incorporate the present invention. In addition, it is desirable for the present invention to maintain a minimum boiler temperature.

Another problem that occurs is when the control circuitry is set to maintain a minimum water temperature and the temperature sensor is not in the boiler. In the prior art, the control circuitry would incorrectly determine that the water temperature is too low, and try to run the boiler, causing an unsafe, high temperature condition. This is generally referred to as a "run-away boiler" condition. In the present invention, if the dual probe sensor is connected to the control circuitry but not inserted into the well, the control circuitry will sense a low water condition, and not allow the burner to fire.

SUMMARY OF THE INVENTION

Bearing in mind the problems and deficiencies of the prior art, it is therefore an object of the present invention to provide a probe for sensing water level (low water cutoff) and temperature in a single unit.

It is another object of the present invention to provide a probe for sensing water level and temperature in a single unit that allows for integration into an existing tapping.

It is another object of the present invention to provide a probe in a well that may accommodate both sensing functions of low water cutoff and temperature measurement within the integration of an existing tapping, or may accommodate temperature measurement alone.

It is yet another object of the present invention to provide a control unit that allows a user to set the limits for temperature and monitor low water conditions.

It is another object of the present invention to provide visual signals to the user to indicate which functions, temperature and low water, are currently active.

A further object of the present invention is to provide a safe condition when the dual probe sensor is connected to the control circuitry but not properly inserted within the well, which would otherwise cause a run-away boiler condition.

Still other objects and advantages of the invention will in part be obvious and will in part be apparent from the specification.

The above and other objects, which will be apparent to those skilled in the art, are achieved in the present invention, which is directed to a probe having a dual measurement function within a well inserted within a boiler tapping comprising: a temperature sensor including at least one thermistor in a housing; thermistor conductors connecting to the at least one thermistor and protruding from the housing; and a low water cutoff sensor including a conductive member connecting to a low water cutoff conductive wire, forming a compression fit against the well interior, the conductive member and the low water cutoff conductive wire in electrical communication with the well, such that the conductive member and the low water cutoff conductive wire are at approximately the same voltage potential as the well. The probe may also include a sheath surrounding the thermistor conductors, the sheath providing rigidity for the thermistor conductors to allow for manual installation within the well without having the thermistor conductors collapse upon insertion.

The well further includes a conductive nut threaded for threadedly securing into the boiler tapping and in electrical communication with the boiler interior wall; and a dielectric spacer electrically separating the well, the low water cutoff conductive member, and the low water cutoff conductive wire from the conductive nut, such that a conductive path between the boiler interior wall and the well is formed when water within the boiler interior surrounds and contacts the well, and the conductive path is open when the water within the boiler interior does not surround or contact the well.

The housing may comprise a temperature sensitive thermoplastic (TPE) over-mould. The low water cutoff conductive member preferably includes beryllium copper (BeCu), and is seated in an exterior channel or groove with the member. The thermistor is preferably encapsulated in a resin that may include blue hysol. The probe outputs may be integrated with an outdoor temperature sensor, a return temperature sensor, an ambient temperature sensor, and the like, and these boiler system and environmental temperature measurements may be collectively utilized to control boiler function.

In a second aspect, the present invention is directed to a system for monitoring low water cutoff and temperature in a boiler comprising: a temperature sensor within a housing, in which the housing may have an external channel or groove; conductors connecting to the temperature sensor and protruding from the housing; a semi-rigid sheath surrounding the conductors; a low water cutoff sensor including: a conductive member connecting to a low water cutoff conductive wire, where a first portion of the conductive member may be within the housing, and a second portion of the conductive member may be seated external to the housing and may also be within the external channel or groove, and forming a compression fit against the well interior, the conductive member and the low water cutoff conductive wire in electrical communication with the well, such that the conductive member and the low water cutoff conductive wire are at approximately the same voltage potential as the well; a conductive nut threaded for connection to the boiler interior wall and in electrical communication with the boiler interior wall; a dielectric spacer electrically separating the well, the low water cutoff conductive member, and the low water cutoff conductive wire from the conductive nut, such that a conductive path between the boiler interior wall and the well is formed when water within the boiler interior surrounds and contacts the well, and the conductive path is open when the water within the boiler interior does not surround or contact the well; and a controller comprising: a microprocessor: a unity buffer receiving input signals from the probe and providing a high impedance input for the microprocessor; and software for filtering the temperature sensor and the low water cutoff sensor inputs.

In a third aspect, the present invention is directed to a method for replacing an existing temperature sensor in a single tapping well within a boiler with a dual functioning low water cutoff sensor and temperature sensor probe, the method comprising: removing the existing temperature sensor from the single tapping well; inserting a dual functioning probe within the well comprising: the temperature sensor probe having a housing and conductors protruding from the housing, peripherally protected by a semi-rigid sheath, the housing having an external channel or groove; the low water cutoff sensor probe including a conductive member connecting to a low water cutoff conductive wire, having a first portion of the conductive member within the housing, and a second portion of the conductive member seated external to the housing and within the external channel or groove, and forming a compression fit against the well interior, the conductive member and the low water cutoff conductive wire in electrical communication with the well, such that the conductive member and the low water cutoff conductive wire are at approximately the same voltage potential as the well; and connecting the probe to a microcontroller circuit.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED
EMBODIMENT(S)

In describing the preferred embodiment of the present invention, reference will be made herein to FIGS. 1-9 of the drawings in which like numerals refer to like features of the invention.

The present invention teaches a dual functionality of temperature control measurement and low water cut-off measurement within a single tapping in a boiler. This dual functionality combines a low water cut-off and temperature sensor into one control utilizing a sensing element suitable for use in an existing ¾" tapping for typical boilers. The tappings generally comprise a threaded brass nut for insertion in a boiler housing wall, a hollow, cylindrical temperature/low water cutoff well for protecting and securing the sensors, and an insulator (dielectric), which electrically separates the brass nut from the cylindrical well. The sensor well allows a user to insert the temperature sensor and low water cutoff sensor without draining the system. Importantly, the sensor well may be used for both temperature and low-water cutoff measurements. In this manner, the dual function capability may be employed in boilers where only a single tapping is available.

Figure 1:
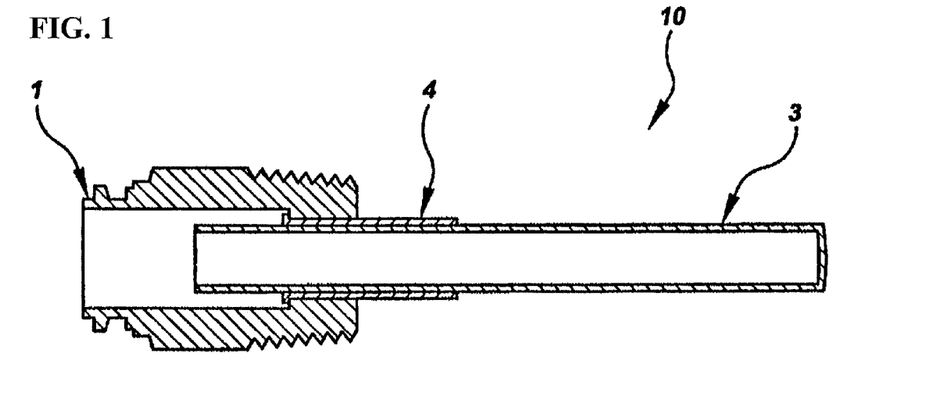
FIG. 1 depicts an assembly drawing of a sensor well.

FIG. 1 depicts an assembly drawing of a well 10 of the present invention. A brass well nut 1 is securely and circumferentially attached to the temperature/low water cutoff well or tube 3. Insulator 4 extends circumferentially around a portion of well 3, electrically isolating brass nut 1 from well 3. In this manner, electrical connection between the well 3 and brass nut 1 is communicated only by the conductivity of surrounding water. If the water level is below well 3, the electrical connection is broken, and a low water cutoff condition is realized. Typically, well 3 is made of copper, although other conductive metal combinations may be used with equal success. Importantly, well 3 extends through, but makes no contact with, brass nut 1. Any contact would result in the electrical shorting of the low water cutoff circuitry. Brass well nut 1 may be any other suitable, non-brass material, provided it can survive the exposure requirements in adverse boiler environments, and lend suitable conductivity for the proper operation of the low water cutoff control circuitry. The electrical isolation between well 3 and brass nut 1 is controlled by insulator 4. Insulator 4 is preferably made of a material that substantially resists electrical connection, such as a modified polyphenylene oxide resin (PPO), or the like. One such example is NORYL® N300X, which is a blend of polyphenylene ether (PPE) and polystyrene (PS).

Brass nut 1 includes a threaded portion, or some other appropriate means for connecting the probe assembly to the boiler. Importantly, brass nut 1 allows well 10 to be inserted within the wall of a boiler above the minimum water line, and remain there indefinitely by creating a watertight seal upon installation. The connection of brass nut 1 to the wall of the boiler also allows well 10 to be in electrical communication with the boiler interior wall. Generally, in operation, portions of well 3 and insulator 4 are exposed within the boiler interior to the water. Simultaneously, brass nut 1, which is in electrical communication with the boiler interior wall, is also exposed to the water. When an electrical signal is applied to well 3, it remains isolated from brass nut 1 as well as the boiler interior wall. In this manner, no electrical communication is established between well 3 and brass nut 1. This is because insulator 4 prohibits electrical conductivity. Under normal operating conditions, the water level is high enough in the boiler to surround and encompass exposed portions of well 3 and brass nut 1. The conductivity of the water effectively bypasses the operation of insulator 4 and completes the low water cutoff circuit, connecting well 3 to the boiler interior wall at brass nut 1. When electrical connection is detected, the control circuitry connected to the probe determines that adequate water is in the boiler. When the water level is below well 10, well 3 is no longer in electrical communication with the boiler interior wall at brass nut 1. The absence of an electrical signal to complete the circuit, i.e., an open circuit, allows the system to determine that the water level is sufficiently low, and subsequently shuts down the burner.

Figure 2:
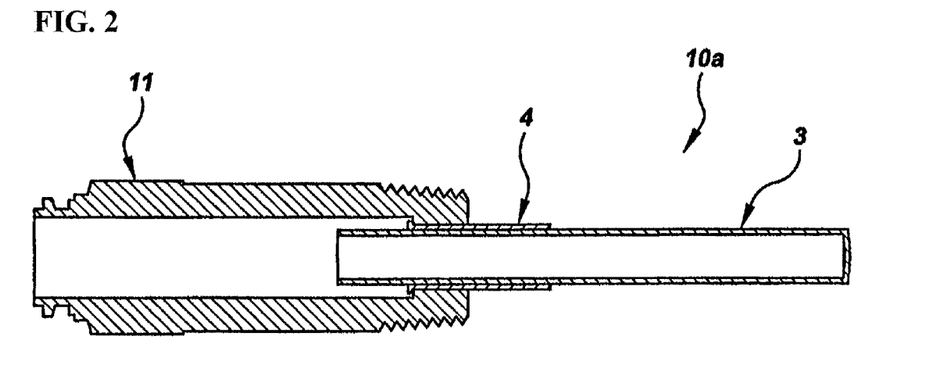
FIG. 2 depicts an assembly drawing of the well of FIG. 1 with an elongated brass nut.

FIG. 2 depicts an assembly drawing of a well 10a of the present invention with an elongated brass nut 11. Electrically, the well 10a configuration of FIG. 2 is the same as the well 10 configuration of FIG. 1.

Figure 3A:
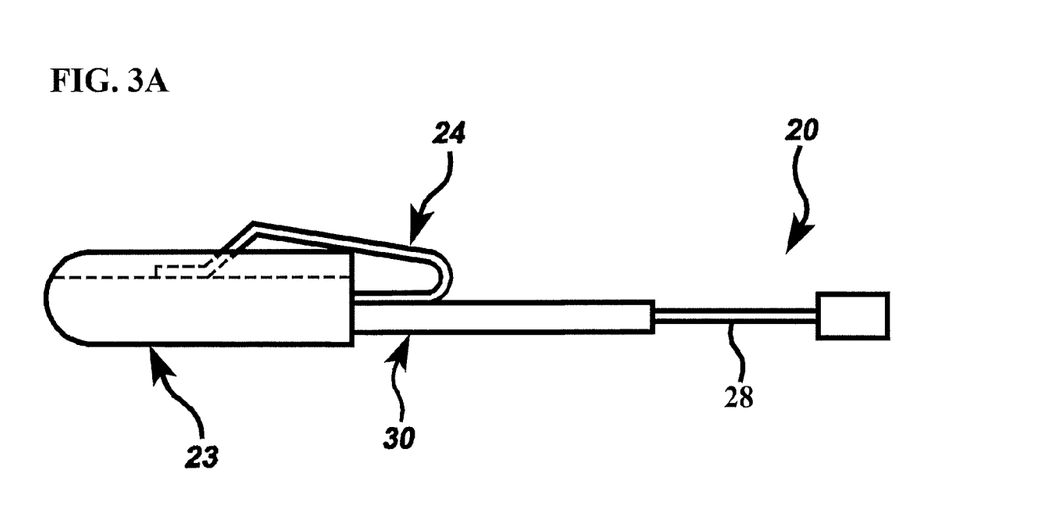
FIGS. 3A & 3B depict a combined low water cutoff and aquastat thermistor insert for installation into the proposed embodiments of FIGS. 1 and 2.
Figure 3B:
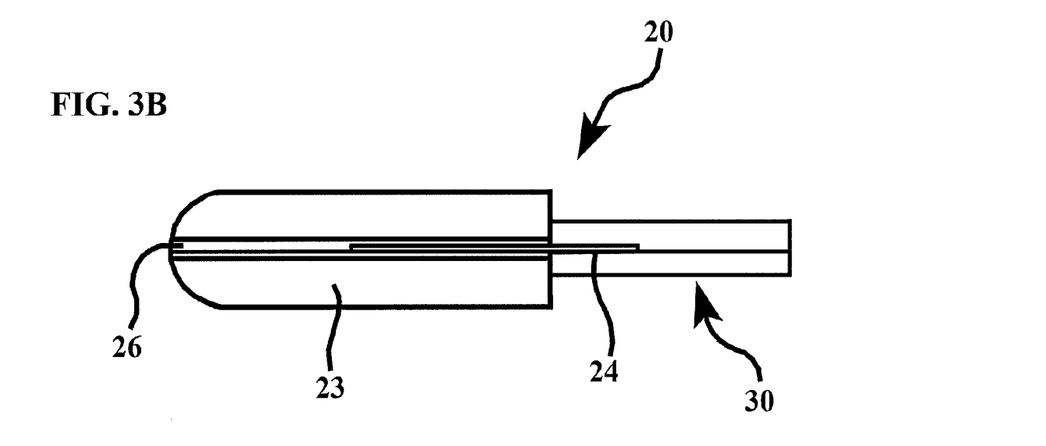

FIGS. 3A and 3B depict a combined low water cutoff and thermistor insert for installation into the proposed embodiments of FIGS. 1 and 2. The probe 20 contains preferably two thermistors per assembly (not shown), encased within a temperature sensitive thermoplastic (TPE) over-mould 23. As illustrated in FIGS. 3A and 3B, probe 20 is secured in well 3 by a resilient, compression-fit conductive member 24, such as a wire having a spring constant, a shaped wire clip (shown), a peripheral or semi-peripheral resilient conductive band, or a solid-shaped conductive material capable of fitting within the well to ensure good electrical contact with the well interior wall, and which may provide a compressive force that simultaneously holds or pushes an adjacent temperature sensor against the well interior wall. If conductive member 24 is in the form of a resilient wire, it is preferably constructed of beryllium copper (BeCu). Conductive member 24 is configured to extend upward from the surface of probe 20. Conductive member 24 terminates on a conductor within the assembly. In doing so, conductive member 24 makes electrical connection with well 3, which is exposed to the boiler water environment. This connection allows a low water cutoff signal to propagate from the controller circuitry, making a circuit with well 3 and the electrically isolated brass nut 1 when conductive water is present. Conductive member 24 forms part of the contact path for the low water cutoff circuit. The water provides the connection from well 3 to brass nut 1, thereby bypassing insulator 4. When water is no longer present, the low water cutoff circuit is open, i.e., insulator 4 does not allow the signal to propagate, and a low water level is detected. The conductive member 24 secures the thermistor assembly within a well by forming a compression fit, while simultaneously providing a secure fitting for electrical contact for the low water cutoff signal. This design readily accommodates existing wells that were not otherwise constructed for this purpose. The probe of the present invention may be placed in a temperature sensor well design that is unable to accommodate a low water cutoff application. The supporting control circuitry will measure temperature, while the low water cutoff electrical signal monitors resistance. If the probe is in a temperature-sensor only well, the conductive member will sense zero ohms of resistance and temperature sensing will remain active while the low water cutoff function is inactive. This allows the present invention to replace an existing, non-dual function probe, and provide at least the same functionality as the probe it replaced.

The conductive member ensures that the probe of the present invention is inserted in the well. In contrast, if a probe is not inserted in the well, the temperature measurement cannot be sensing boiler temperature. This would cause a controller connected to a prior art probe to initiate a continuous firing of the boiler, otherwise known as a run-away boiler condition. However, in the present invention, a signal from the conductive member will ensure that the probe is inserted. Ensuring that the probe is installed in the well addresses this run-away boiler condition in a manner that is unique to the present invention.

In the preferred embodiment, the encapsulated thermistor 20 has a 30 K-ohm resistance at 25° C. with an operating temperature range on the order of −40° C. to +125° C. Clearly, these specifications are boiler dependent, and may be adjusted for specific applications. In operation, probe 20 is placed in well 3. When inserted, conductor 24 is forced down into channel 26. This ensures that conductive member 24 will remain in pressure contact with the interior wall of well 3. The wires 28 connected to, and extending from, probe 20, are covered by a heat-shrink wrap 30. This heat-shrink wrap serves the dual function of insulating the wiring system from the environment, and also providing rigidity to the wire structure. For the preferred two-thermistor design, four conductors are used, such as 26 AWG 7/34 T.C., or the like, with insulation and an overall TPE cable jacket. The rigidity provided by the wrapping allows the thermistor assembly, including the compression-fit conductive member 24, to be push-inserted within an existing well without collapsing onto itself. In contrast, the thermistor disclosed in U.S. Pat. No. 5,111,691 issued to John, teaches wires without any means for rigidity, mainly because the John disclosure does not suggest or teach using the thermistor assembly for replacement in wells that were not specifically designed for it. The '691 patent also does not include a wire member assembly necessary to engage with the well simultaneously for a low water cutoff signal and temperature sensing signal.

Thus, the present invention allows for a dual probe combining temperature measurement and low water cutoff to be inserted within an existing well of a boiler without requiring a new tapping. The probe can be inserted within an existing well because of the rigidity of the wire system that allows the thermistor to be friction fit while providing for electrical connection for the low water cutoff signal. The control circuitry may then monitor safe operation of the boiler. However, dual sensing may be accommodated only if the existing well includes a dielectric spacer for the low water cutoff signal conductivity measurement.

Figure 4:
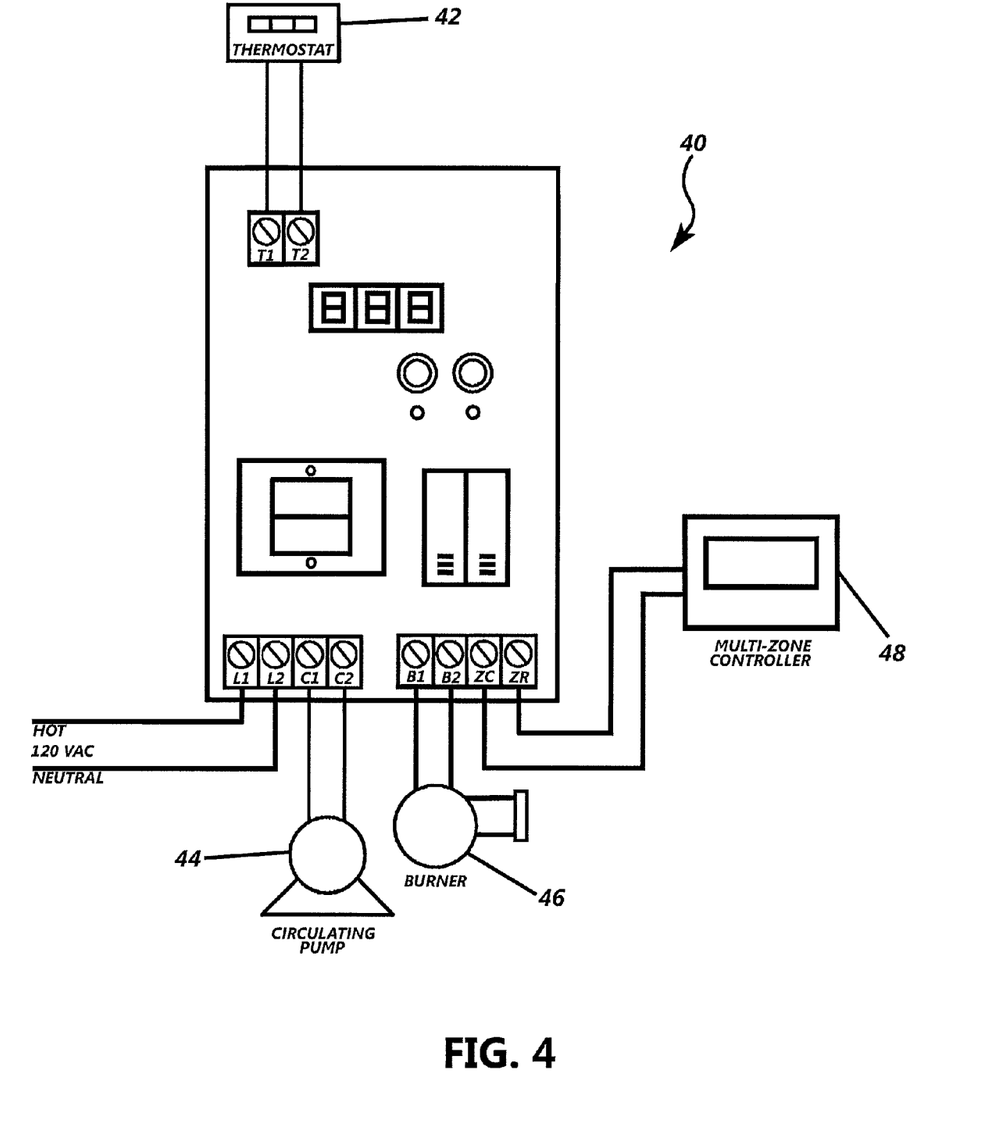
FIG. 4 is a wiring diagram for a control system.

FIG. 4 is a wiring diagram 40 for a control system. The wiring diagram depicts how a thermostat 42, circulating pump 44, burner 46, and multi-zone controller 48 are connected in a preferred embodiment.

Figure 5:
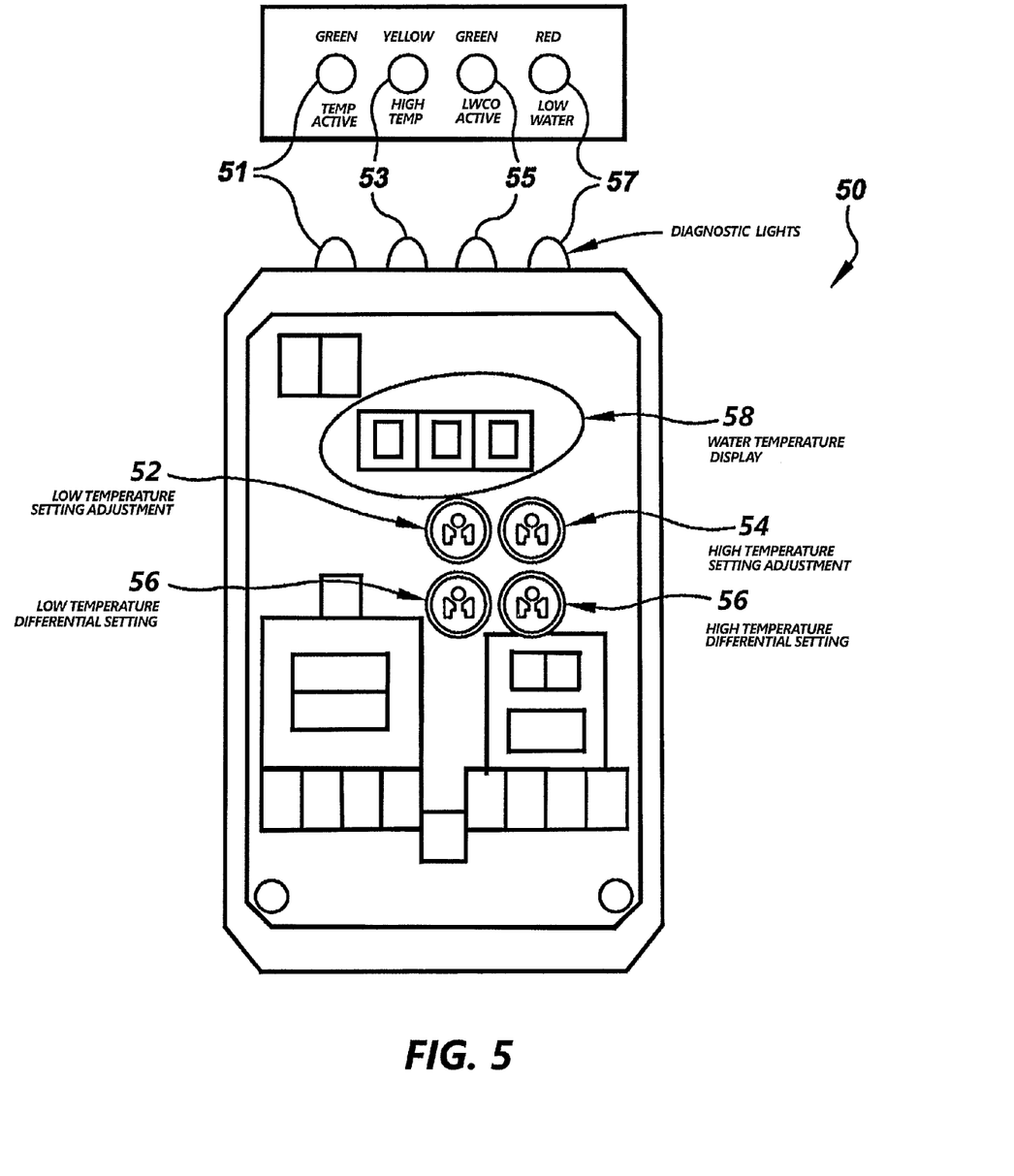
FIG. 5 depicts the control system of the instant invention.

FIG. 5 depicts the control system 50 of the instant invention. Control system 50 has controls that allow for adjusting the low temperature setting 52, high temperature setting 54, and the temperature differential 56. A display 58 is used for indicating the water temperature to the user or technician. Diagnostic lights 51, 53, 55, and 57 indicate active temperature, high temperature, active low water cutoff, and low water, respectively.

In operation, a temperature control circuit is used in conjunction with the temperature sensor. The temperature sensor inputs a temperature signal for sensing a high temperature range with adjustable differential. The measured temperature is used to determine the operation of the burner through comparator circuitry and relays for the safety functioning of the burner, e.g., a high temperature condition may require burner shut-off and a low temperature condition may require the burner to be turned on. A thermostat signal is also used as an input to allow for a "demand heat" condition.

A conductance sensor is used for measuring the variable conductivity of the water in the boiler. The sensor receives an AC source signal and provides a variable resistance to the signal based on the conductivity of the water. The variable resistance forms a resistor divider network with a predetermined series resistance. The AC source signal (rail voltage) is preferably a 5 volt signal operating at approximately 400-500 Hz. The probe input is on the order of 100 mV of the rail. Specifically, the source signal is preferably sinusoidal with an amplitude span of approximately +2.5 volts to −2.5 volts (peak-to-peak). Generally, there are no active electronics within the sensor, although the present design does not preclude the addition of such devices. The resistance divider formed by a series resistor and a variable resistance, which represents the measured water conductance, acts to attenuate the source signal in an amount proportional to the water conductivity.

Figure 6:
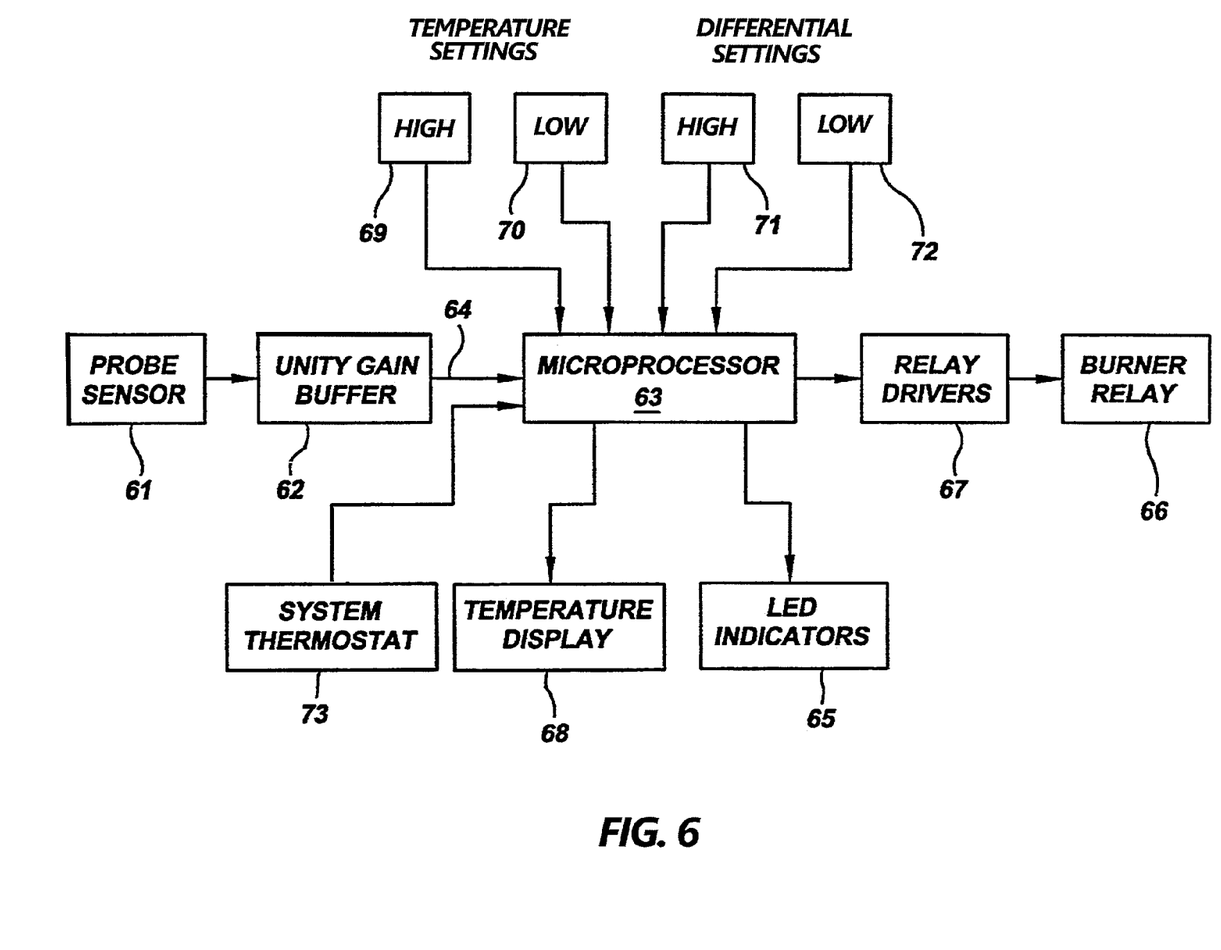
FIG. 6 depicts flow chart of one embodiment of the control system of the present invention.

Referring to FIG. 6, the probe input 61 is then directed to a unity buffer 62, which provides a high impedance for interfacing with the analog input of the microprocessor 63. The signal is biased at +2.5 volts through a high impedance resistor. This shifts the signal from ±2.5 volts (p-p) to 0-5 volts (p-p), which enables it to be received properly at the analog input of microprocessor 63. No amplification is performed during this biasing. The probe input port is voltage surge protected by a diode.

Microprocessor 63 receives the buffered probe signal at an analog input 64 to microprocessor 63. The analog input signal is normally sampled in sequence with a drive signal (AC source signal). Microprocessor 63 performs a sample-and-hold function for a high output drive signal and a low output drive signal, respectively. The signal's peak-to-peak voltage is then measured. Internal to the microprocessor is an analog-to-digital (A/D) converter that converts the bias signal returned from the probe into a digital value with 8-bit resolution (0-255).

Software filtering is performed by the microprocessor at a preferred rate of approximately 1/10 Hz. Sixteen samples are measured and averaged in order to eliminate or account for externally induced noise. A second average (long-term average) is performed with the sixteen-sample averaged value. The resultant averaging function filters out adverse effects due to air bubbles and probe-induced or probe-coupled transients. The measured, averaged value is then compared via software to threshold conditions such as: a) shorting; b) good/poor conductivity threshold; and c) an empty boiler condition. As the measurement software loop progresses, the resultant determination (short, good conductor, etc.) must be shown to persist for a predetermined number of cycles before a declaration may be made and action taken. If the measurement condition is removed before the predetermined number of cycles is accumulated, a counter is reset and the measurement cycle is repeated. Once an actionable condition is determined, the user is notified by a series of LED indicators 65 and appropriate action is taken, e.g., the boiler may be shut down for a "no water" condition.

The action taken by the controller includes toggling a burner relay 66. Relay 66 is turned on or driven by a relay driver circuit 67 which requires redundant burner signals to ensure that any action affecting burner operation is not based on faulty circuitry.

Preferably, four settings are available for the temperature display 68 of the present invention: high temperature 69; low temperature 70; high temperature plus differential 71; and low temperature plus differential 72. The high temperature settings 69 and 71 limit the boiler water temperature to a safe operating temperature. The low temperature settings 70 and 72 maintain a minimum temperature in the boiler. In a cold start condition, the burner does not fire unless there is a call for heat from the system thermostat 73. In the low temperature sensor limit of the present invention, turning the temperature control setting to off, turns the controller into a cold start apparatus.

Figure 7:
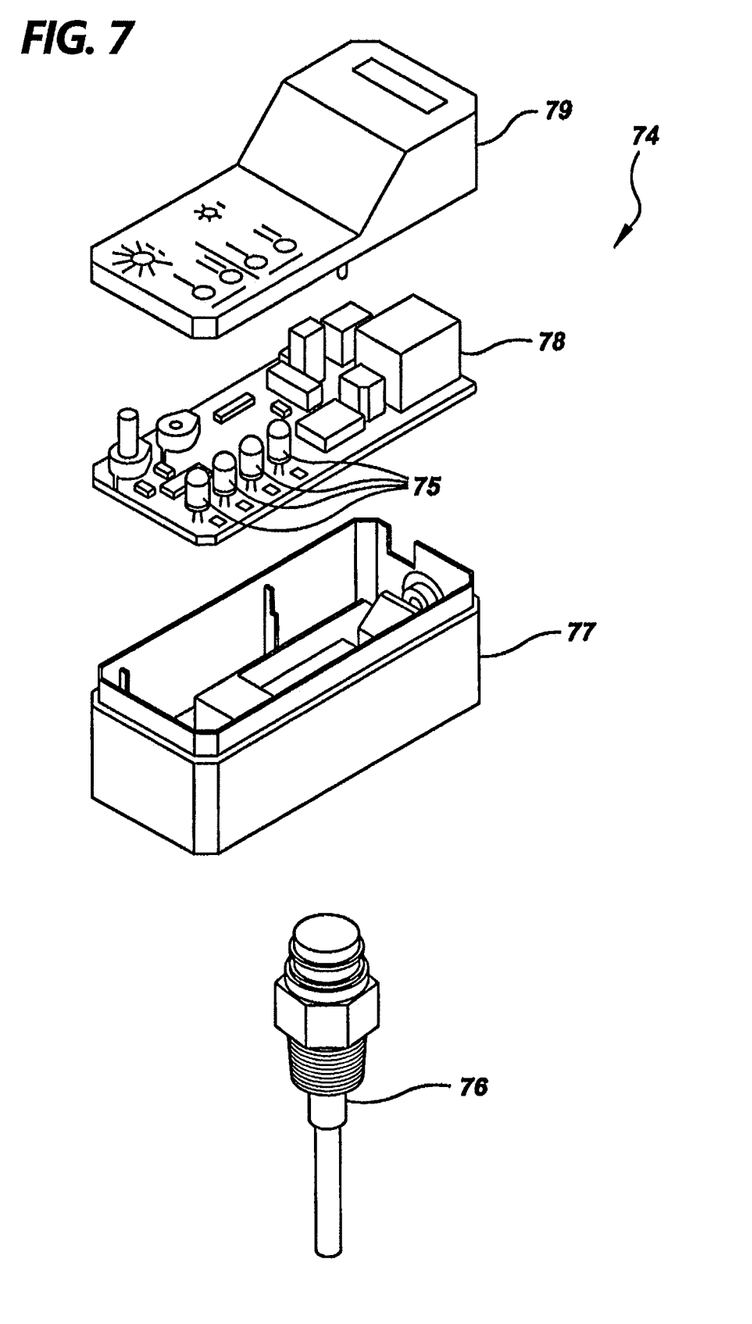
FIG. 7 is an assembly drawing of a gas boiler control housing of the present invention having high/low temperature and low water cutoff indicators.

FIG. 7 is an assembly drawing of a gas control housing 74 of the present invention having high/low temperature and low water cutoff indicators 75. Probe well 76 is shown drawn to approximate scale. Housing 74 comprises a lower module 77, a printed circuit board assembly 78, and a housing cover 79. Circuit board assembly 78 includes electronics, the high temperature and low water indicators, a temperature probe check (HT active), a water probe check (LW active), high temperature settings, high temperature differential, and burner firing signals.

Figure 8A:
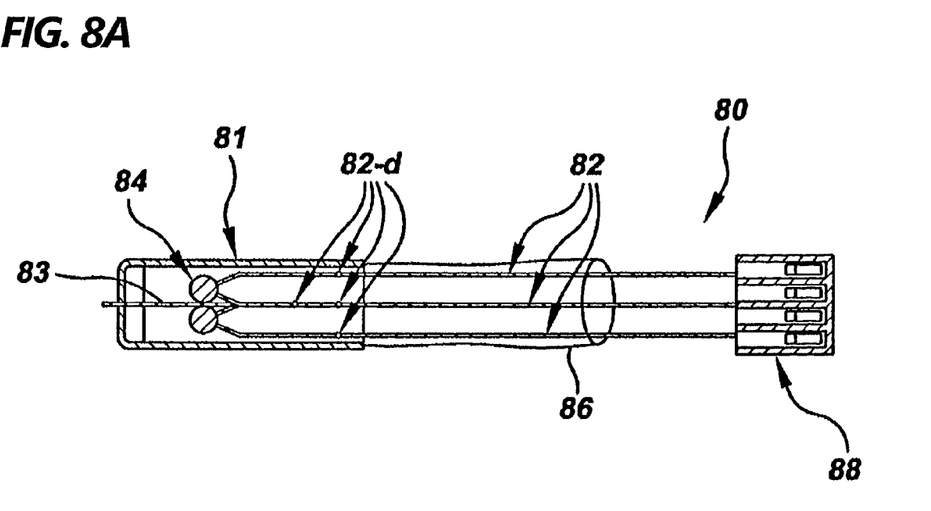
FIGS. 8A and 8B depict a top and side cross-sectional view, respectively, of the present invention.
Figure 8B:
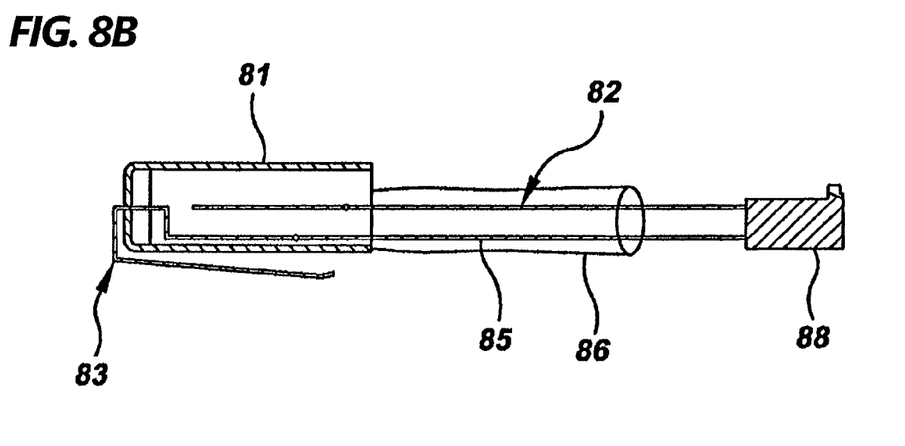

FIGS. 8A and 8B depict the temperature sensor assembly 80 of the present invention. The conductors 82 from each of two thermistors 84 are wrapped in semi-rigid heat shrink tubing 86 and terminated with connectors 88, preferably using terminals such as AMP P/N 770666, or the like, and a corresponding connector, such as AMP P/N 770602-4, or the like. The heat shrink tubing is preferably a polyolifine heat shrink sleeve or equivalent. The thermistors are housed in a plastic or metal housing 81. In one embodiment the thermistors are first encapsulated in a resin, such as blue hysol or the like. Conductors 82 are soldered to each thermistor lead. The solder joints are protected by an adhesive lined polyolifine sleeve, preferably a sleeve with a temperature rating on the order of 135° C. Sharing the same housing is beryllium copper conductor clip 83, which connects to its own dedicated conductor 85. Clip 83 extends outside of housing 81 in order to make contact with the metal interior wall of the well. Clip 83 may be formed from 22 AWG wire or other resilient material. Clip 83 helps position the thermistors 84, which are opposite the clip, against the well.

Many different versions of temperature probes are suitable for use in the present invention. In one embodiment, a preferred probe includes epoxy coated point matched disc thermistors with nickel PTFE insulated lead wires. One such probe may be comprised of NTC thermistors from GE. These probes have a solid-state sensor, strong mechanical strength, and a wide operating temperature range of about −50° C. to 150° C. Another such sensor is a Betatherm Corporation sensor, which is also a ceramic chip NTC thermistor design with nickel plated CP wire, and glass encapsulating material. These probes are representative of the types of probes which may be used in the present invention; however, the present invention may accommodate other probe designs, and is not limited to the probes identified above, provided each probe meets the physical restraints of the well design, and the environmental restrictions on boiler operation.

Figure 9:
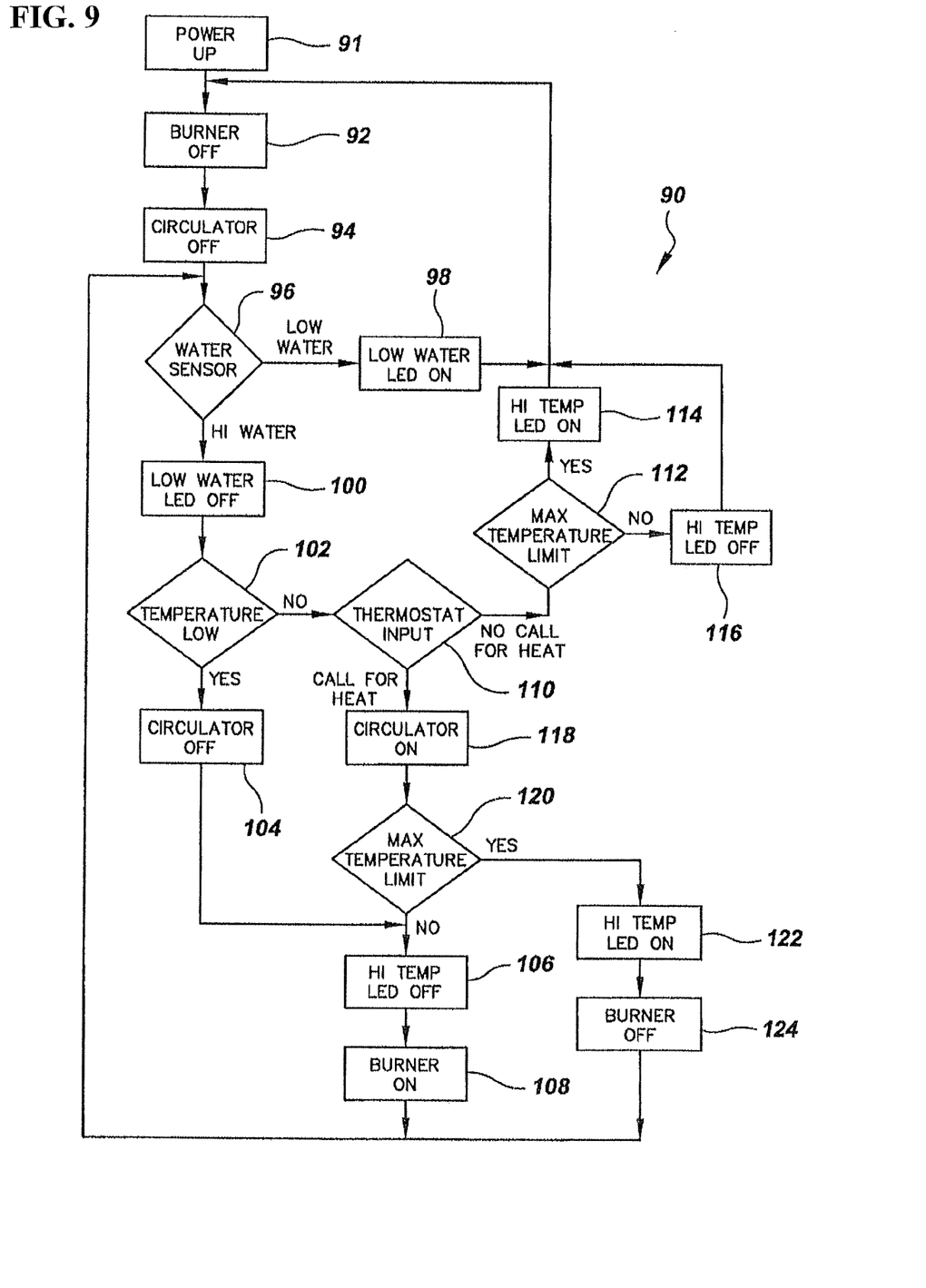
FIG. 9 depicts the program flow for utilizing the dual probe design of the present invention.

FIG. 9 depicts the program flow 90 for utilizing the dual probe design of the present invention. Upon initiating the power up sequence 91, the burner 92 and circulator 94 are off. The water sensor is first initiated 96. For a low water condition, the low water LED is activated 98 and burner 92 and circulator 94 are turned off or kept off. For a high water condition, the low water LED is either switched off or kept off 100. A temperature measurement is made 102. If the temperature is low, the circulator is turned off or kept off 104. The high temperature LED is turned off or kept off 106, as the case may be, and the burner is activated or turned on 108. If the temperature measurement 102 is not low, the thermostat input is monitored for a call for heat 110. If there is no call for heat, the maximum temperature limit is checked 112. If the maximum temperature is reached, the high temperature LED is turned on 114 and the burner 92 and circulator 94 are turned off. If the maximum temperature limit 112 is not attained, the high temperature LED 116 remains off, and again the burner 92 and circulator 94 also remain off. If the thermostat input 110 calls for heat, the circulator is turned on 118. The maximum temperature limit is monitored 120. When the maximum temperature is reached, the high temperature LED is turned on 122, and the burner is turned off 124. The water sensor is then monitored 96. If Maximum temperature is not reached, the high temperature LED 106 is turned off or kept off and the burner 108 is turned on or kept on. The water sensor 96 is then monitored.

Importantly, the present invention's controller allows for external temperature inputs as well as various boiler system temperature inputs. This would include outdoor temperature, boiler return temperature, boiler supply temperature, indoor temperature, and the like. This allows for efficient burner operation under various environmental and system conditions. For example, in this manner, an outside temperature or call for heat is monitored, and the boiler is limited to the outdoor reset controller conditions. Thus, the dual function sensors are integrated with a controller that monitors external environmental temperature. If the controller system monitors a high outside temperature, it would regulate its temperature accordingly. Otherwise, the system would not distinguish between a moderate fifty-degree day and a cold ten-degree day, insomuch as it will work all the time as if it is in an environment of a cold day all year long. It will consistently heat the water to a maximum temperature without regard for the outside temperature. By incorporating boiler system and environmental temperature measurements, the system can provide significant energy efficiency.

One feature of the present invention is the ability to replace sensors from existing controllers without replacing the wells, that is, it has the unique ability to be interchangeable with current systems. In some systems, it is possible that the interchange of the present sensor system into an existing system will not allow the dual function of the present invention to be completely activated. In these circumstances, only temperature function may be employed. Indicator lights will signal which functions are active.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for replacing an existing temperature sensor in a single tapping well within a boiler with a dual functioning low water cutoff sensor and temperature sensor probe, said method comprising:
   removing said existing temperature sensor from said single tapping well;
   slidably inserting said dual functioning low water cutoff sensor and temperature sensor probe within said well, said dual functioning probe comprising:
   a temperature sensor within a housing inserted into a well within a boiler tapping;
   a low water cutoff sensor in electrical communication with said well interior;
   a resilient flexible connector forming the electrical communication from said low water cutoff sensor to said well interior, such that said low water cutoff sensor senses a voltage potential of said well;
   electrically connecting said dual functioning probe to a microcontroller; and
   operating said dual functioning probe using said microcontroller having software for analyzing said temperature sensor and said low water cutoff sensor signals.

2. The method of claim 1 further including having said microcontroller monitor said low water cutoff circuit to determine if said low water cutoff sensor probe is active.

3. The method of claim 1 wherein said step of removing said existing temperature sensor from said single tapping well includes removing said existing temperature sensor from a boiler controller that does not accommodate a low water cutoff application.

4. A removable probe insertable within a well in a boiler tapping and having a dual measurement function, comprising:
   a temperature sensor; and
   a low water cutoff sensor in electrical communication with said well interior and formed by a resilient flexing connection, wherein said low water cutoff sensor includes a conductive member comprising a solidly-shaped conductive material, said solidly-shaped conductive material in electrical communication with said well interior without soldering or welding said conductive member to the interior of said well.

5. The removable probe of claim 4 wherein said temperature sensor outputs are integrated with a controller that monitors outdoor temperature, boiler return temperature, boiler supply temperature, or indoor temperature.

6. The removable probe of claim 4 wherein said temperature sensor includes a thermistor.

7. The removable probe of claim 4 wherein the low water cutoff sensor further includes a conductive nut for threadedly securing into said boiler tapping, said conductive nut in electrical communication with an interior wall of said boiler and forming a conductive path between said interior wall of said boiler and said well when water within said boiler interior surrounds and contacts said well, said conductive path is open when said water within said boiler interior does not surround or contact said well.

\* \* \* \* \*